United States Patent
Lambertz et al.

(10) Patent No.: US 11,208,015 B2
(45) Date of Patent: Dec. 28, 2021

(54) MOTOR VEHICLE DOOR LOCK, PARTICULARLY A BACKREST LOCK ON A MOTOR VEHICLE SEAT

(71) Applicant: Kiekert AG, Heiligenhaus (DE)

(72) Inventors: Karl Lambertz, Troy, MI (US); Tommy Toma, Commerce Township, MI (US); Robert J. Hunt, Davisburg, MI (US)

(73) Assignee: Kiekert AG, Heiligenhaus (DE)

(*) Notice: Subject to any disclaimer, the term of this patent is extended or adjusted under 35 U.S.C. 154(b) by 375 days.

(21) Appl. No.: 15/557,188

(22) PCT Filed: Mar. 11, 2016

(86) PCT No.: PCT/IB2016/000283
§ 371 (c)(1),
(2) Date: Sep. 11, 2017

(87) PCT Pub. No.: WO2016/142771
PCT Pub. Date: Sep. 15, 2016

(65) Prior Publication Data
US 2018/0043801 A1 Feb. 15, 2018

Related U.S. Application Data

(60) Provisional application No. 62/131,903, filed on Mar. 12, 2015.

(51) Int. Cl.
*B60N 2/36* (2006.01)
*E05B 79/20* (2014.01)
(Continued)

(52) U.S. Cl.
CPC ............ *B60N 2/366* (2013.01); *E05B 79/20* (2013.01); *E05B 81/14* (2013.01); *E05B 81/16* (2013.01); *E05B 81/25* (2013.01); *E05B 85/26* (2013.01)

(58) Field of Classification Search
CPC ......... B60N 2/366; E05B 81/16; E05B 79/20; E05B 81/25; E05B 85/26; E05B 81/14; E05B 81/28
(Continued)

(56) References Cited

U.S. PATENT DOCUMENTS

| | | | | |
|---|---|---|---|---|
| 4,783,102 A | * | 11/1988 | Bernard | E05B 85/26 292/216 |
| 8,480,138 B2 | * | 7/2013 | Bendel | E05B 85/26 292/201 |
| 8,596,696 B2 | * | 12/2013 | Cumbo | E05B 85/26 292/216 |
| 8,955,889 B2 | * | 2/2015 | Bendel | E05B 81/20 292/200 |

(Continued)

FOREIGN PATENT DOCUMENTS

| | | |
|---|---|---|
| DE | 10 2007 003948 A1 | 5/2008 |
| DE | 10 2008 028256 A1 | 12/2009 |

(Continued)

OTHER PUBLICATIONS

International Search Report and Written Opinion for corresponding Patent Application No. PCT/IB2016/000283 dated Jun. 28, 2016.

*Primary Examiner* — Kristina R Fulton
*Assistant Examiner* — Thomas L Neubauer
(74) *Attorney, Agent, or Firm* — Renner, Otto, Boisselle & Sklar, LLP

(57) ABSTRACT

The object of the invention is a motor vehicle door lock, particularly a backrest lock (4), on a motor vehicle seat (1). The basic construction of the motor vehicle door lock includes a locking mechanism (7, 8, 9) consisting essentially of a rotary latch (9), a ratchet pawl (7) and a blocking element (8) for the ratchet pawl (7). In addition, a drive unit (15, 16, 17) that acts on a triggering element (12) is provided. According to the invention, the drive unit (15, 16, 17) is constructed as a linear adjustment drive (15, 16, 17), (Continued)

Figure 1:
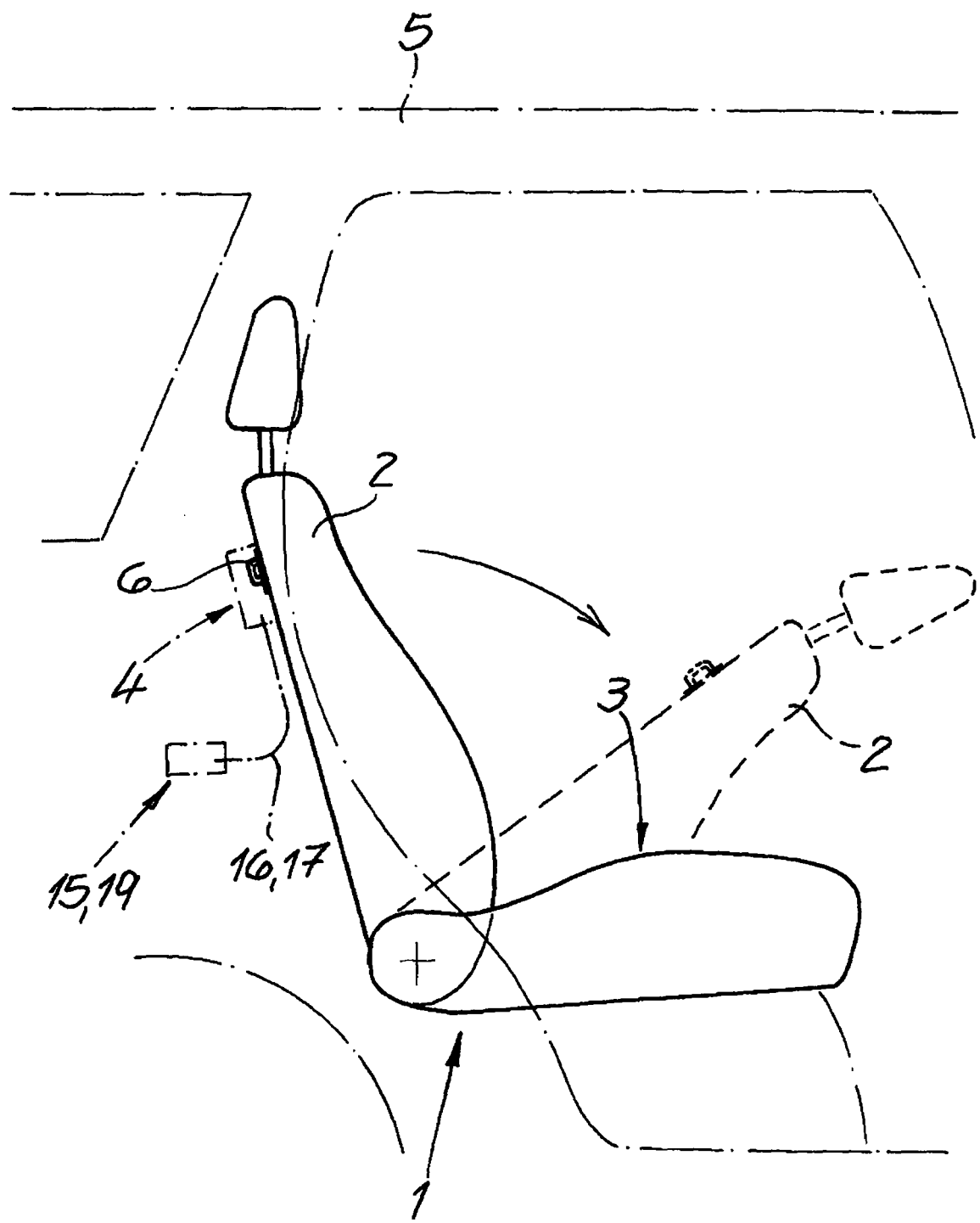

which acts on the triggering element (12) so that it interacts in succession, first with the blocking element (8) and then with the ratchet pawl (7).

11 Claims, 3 Drawing Sheets

(51) Int. Cl.
*E05B 81/16* (2014.01)
*E05B 81/24* (2014.01)
*E05B 85/26* (2014.01)
*E05B 81/14* (2014.01)

(58) Field of Classification Search
USPC .................................. 292/201, 216, DIG. 23
See application file for complete search history.

(56) References Cited

U.S. PATENT DOCUMENTS

| | | | |
|---|---|---|---|
| 9,611,676 B2* | 4/2017 | Bendel | E05B 79/10 |
| 10,132,106 B2* | 11/2018 | Rosales | E05B 77/06 |
| 10,132,109 B2* | 11/2018 | Bendel | E05B 85/26 |
| 2004/0239124 A1* | 12/2004 | Larsen | E05B 81/14 292/201 |
| 2011/0204690 A1 | 8/2011 | Torkowski et al. | |

FOREIGN PATENT DOCUMENTS

| | | |
|---|---|---|
| DE | 10 2008 048712 A1 | 3/2010 |
| DE | 10 2008 057961 A1 | 5/2010 |
| DE | 10 2012 207441 A1 | 11/2013 |
| DE | 10 2013 103 245 A1 | 10/2014 |
| DE | 10 2013 206 889 A1 | 10/2014 |
| EP | 1 410 945 A1 | 4/2004 |
| FR | 2 452 563 A1 | 10/1980 |
| WO | 2011/120719 A1 | 10/2011 |

\* cited by examiner

MOTOR VEHICLE DOOR LOCK, PARTICULARLY A BACKREST LOCK ON A MOTOR VEHICLE SEAT

This application is a national phase of International Application No. PCT/IB2016/000283 filed Mar. 11, 2016 and published in the English language, which claims priority to U.S. Provisional Patent Application No. 62/131,903 filed Mar. 12, 2015, which are hereby incorporated herein by reference.

The invention relates to a motor vehicle door lock, particularly a backrest lock on a motor vehicle seat, with a locking mechanism consisting essentially of a rotary latch, a ratchet pawl and a blocking element for the ratchet pawl, and with a drive unit that acts on a triggering element.

In motor vehicle door locks with a locking mechanism consisting essentially of a rotary latch, a ratchet pawl and a blocking element, the blocking element normally helps to ensure that the ratchet pawl is braced thereon and blocked thereby. In this context, the blocking element is often referred to as a second ratchet pawl. The purpose of the blocking element or ratchet retaining pawl is usually to enhance the security of the lock in cases of undesired opening, as happens during a break-in, for example. In contrast to this, in other locking mechanisms with two ratchet pawls, the primary purpose is to allow quiet opening and to prevent the "opening slam" or to suppress the noises associated with opening, or at least to minimise them.

One example of a motor vehicle door lock with a locking mechanism consisting essentially of a rotary latch, a ratchet pawl and a blocking element in which the blocking element enhances the security of the lock is described in the species-defining DE 10 2008 028 256 A1, owned by the Applicant. The subject matter in this case is a closing device that is particularly suitable for locking and unlocking seat backrests on motor vehicle seats, and consequently in motor vehicles. The secure, convenient operation and the consideration for safety criteria are addressed in particular. Another objective is to reduce the installation space required and minimise noise generation.

To this end, the species-defining teaching regarding a locking device according to DE 10 2008 028 256 A1 suggests that the locking device should comprise a motorised adjustment drive, which moves at least one triggering lever in such manner that during its movement the triggering lever cooperates with the two ratchet pawls one after the other. In this way, when the locking mechanism is opened, the second ratchet pawl, the blocking element, is pivoted first by the triggering lever. This causes the block on the first ratchet pawl to be cancelled. Afterwards, the triggering lever is brought into contact with the first ratchet pawl, so that the first ratchet pawl is pivoted.

The known teaching is put to use particularly in a motor vehicle, or a motor vehicle seat with a folding backrest. In this context, the backrest is equipped with a closing device of the kind described, and can be locked in a position. The motor vehicle seat is particularly a seat in the rear of the vehicle, the backrest of which is foldable. This arrangement allows access to the luggage compartment or the rear area of the motor vehicle. In general, it has proven sound.

Additionally, the further related art according to DE 10 2013 103 245 A1 concerns itself with a motor vehicle door closure, the locking mechanism of which is again equipped with a ratchet pawl and a blocking element cooperating therewith. In this case, the blocking element is arranged on an edge remote from the rotary latch and laterally overlapping the ratchet pawl. In this way, a particularly compact structure is provided. Consequently, it is then possible to arrange a further, second ratchet pawl, or pre-engagement pawl, on the periphery of the rotary latch if such is needed, in addition to the first ratchet pawl, or comfort pawl, already in place. The comfort pawl typically cooperates with a primary catch of the rotary latch, whereas the pre-engagement pawl cooperates with a preliminary catch of the rotary latch.

In general, the prior art has proven successful. However, the known motor vehicle door locks are still quite bulky and mechanically complex in design. The fundamental cause of the problem is that typically, an electric motor is used, which motor cooperates with a worm gear, which in turn acts on that blocking element and the triggering element. As a consequence, the known motor vehicle door locks are not only of bulky construction, they are also quite heavy. The manufacturing costs therefor are also not ideal. This is the starting point for the invention.

The invention is intended to address the technical problem of further developing such a motor vehicle door lock, and particularly a backrest lock for a motor vehicle seat in such manner that the manufacturing costs and the dimensions are reduced, and also that a reduction in weight is observed.

In order to solve these technical challenges, a species-related motor vehicle door lock within the scope of the invention is characterized in that the drive is constructed as a linear adjustment drive, which acts on the triggering element so that it interacts in succession, first with the blocking element and then with the ratchet pawl.

According to an advantageous variation, the drive or linear adjustment drive is most often a miniature linear adjustment drive, that is to say a linear adjustment drive of such kind with particularly small dimensions and consequently low weight, and at the same time entails lower manufacturing costs. The use of such miniature linear adjustment drives is becoming more and more widespread. Reference is herewith made to the patent DE 10 2013 206 889 A1 held by the Applicant. Also to WO 2011/120719 A1, which are cited in this context for exemplary purposes only and do not represent a survey. At all events, such linear adjustment drives, and particularly miniature linear adjustment drives, are of small size, with a length of not more than a few centimetres, and a width in the region of a centimetre. This also results in a low weight, usually from 100 g to 200 g, and low costs have been observed due to the large numbers of items that are manufactured.

In this way, according to an advantageous variation, the above features make it possible to integrate the drive or the linear adjustment drive in a lock housing. In this case, the drive is consequently located in the lock housing. In such a context, the lock housing itself may consist of a metal lock case that serves both as a support for the locking mechanism and as a plastic lock cap or lock covering.

Alternatively or additionally, however, the drive unit may also be disposed separately from the lock housing in question. In this case, a transmission element is typically provided, which helps to ensure the drive unit acts on the triggering element. The transmission element is preferably a Bowden cable with a sleeve and a core. In this context, the transmission element and consequently also the drive unit is able to transmit forces in both the pulling and the pushing direction. Moreover, it has proven advantageous both in this and other contexts if the drive unit is connected to a base. Such a base may not only support the sleeve of the Bowden cable, but also function as an abutment for the Bowden cable. In most cases, said base is connected to a motor vehicle body. To this extent, in such a case the transmission element or Bowden cable may be braced against the vehicle body via the base, so that the core is able to exert the corresponding forces on the triggering element in opposition thereto.

The locking mechanism as such is usually designed so that the ratchet pawl and the triggering element are mounted on the same axis on the lock case described in the preceding. This alone serves to enable a particularly compact construction. The fact that the triggering element is equipped with a triggering pin contributes further to this end. The triggering pin first moves the blocking element into a position that releases the ratchet pawl. Then, the triggering pin acts on the ratchet pawl.

In order to function with the most compact construction possible and keep the travel paths of the triggering element, and thus also of the triggering pin, as short as possible in this context, the triggering pin is advantageously arranged in a recess in the ratchet pawl. Said recess is usually in the shape of a "U". The design is also realised such that the blocking element is provided on the open end of the recess. As a result, it is sufficient if the movement of the triggering pin provided on the triggering element is practically confined to within the recess.

Thus, according to the invention it is possible with the aid of the drive in the form of a linear adjustment drive to ensure that the triggering element cooperates first with the blocking element and then subsequently with the ratchet pawl. In fact, the triggering element, or the triggering pin connected to the triggering element, does act on the blocking element first. This is possible with a very slight adjusting movement, because the triggering pin is arranged inside the recess in the ratchet pawl, and the blocking element is provided on the open end of the recess.

This causes the blocking element to be displaced or biased far enough so that the ratchet pawl, which is initially secured by means of the blocking element, is released by the blocking element. As a result of this, the ratchet pawl is now able to make pivoting movements about the axis or axis of rotation it shares with the triggering element. These pivoting movements are initiated by the triggering element. Because after the blocking element, the triggering element acts on the ratchet pawl.

In fact, the triggering pin first moves towards the blocking element to cause it to pivot. In so doing, the blocking releases the ratchet pawl. Then the continued movement of the triggering element and consequently of the trigging pin also, causes the triggering pin is able to cooperate with the ratchet pawl. This in turn causes the ratchet pawl to pivot together with the triggering element, and the overall effect thereof is to release the rotary latch, which is secured by the ratchet pawl.

This is all made possible by the use of a largely linear adjustment movement initiated by the linear adjustment drive unit. In fact, in this context only slight pivoting movements of the triggering element, in the order of about 20° to 40°, are required. This is one result of the compact construction with the triggering pin accommodated in the recess in the ratchet pawl and the blocking element that also closes off the recess at the open end. Since only slight and moreover mainly linear movements suffice therefor, they can easily be completed according to the invention with the aid of the linear adjustment drive, and particularly the miniature linear adjustment drive. This enables the costs of the motor vehicle door lock according to the invention to be kept particularly low. This is achieved while still retaining a particularly compact construction. The overall weight of the device is also low.

In this way, the motor vehicle door lock according to the invention is ideally suited for its intended purpose, particularly as a backrest lock in a motor vehicle seat. It has proven particularly advantageous when said backrest lock is used with a rear seat and the foldable backrest associated therewith. In fact, the backrest may be equipped with a retaining bolt. The retaining bolt as such may then also cooperate with the motor vehicle door lock according to the invention, which lock is attached to the vehicle body. Of course, the arrangement may also be reversed. In that case, the motor vehicle door lock is attached to the backrest while the retaining bolt is fastened to the vehicle body.

The drive unit or linear adjustment drive according to the invention may also be unlocked by remote control, for example, so that the previously locked backrest able to move. Since the backrest is typically the backrest of a seat in the rear of the vehicle, the backrest may then be folded down onto a seat surface, for example to allow access to the luggage compartment or boot of the vehicle. Embodiments of such kind are being requested more and more frequently by car buyers these days, so that the vehicle can be adapted flexibly to various loading situations, with or without a front passenger. This is made possible according to the invention by the inclusion of a particularly inexpensive, lightweight and compact motor vehicle door lock. The essential advantages may be seen therein.

Figure 2:
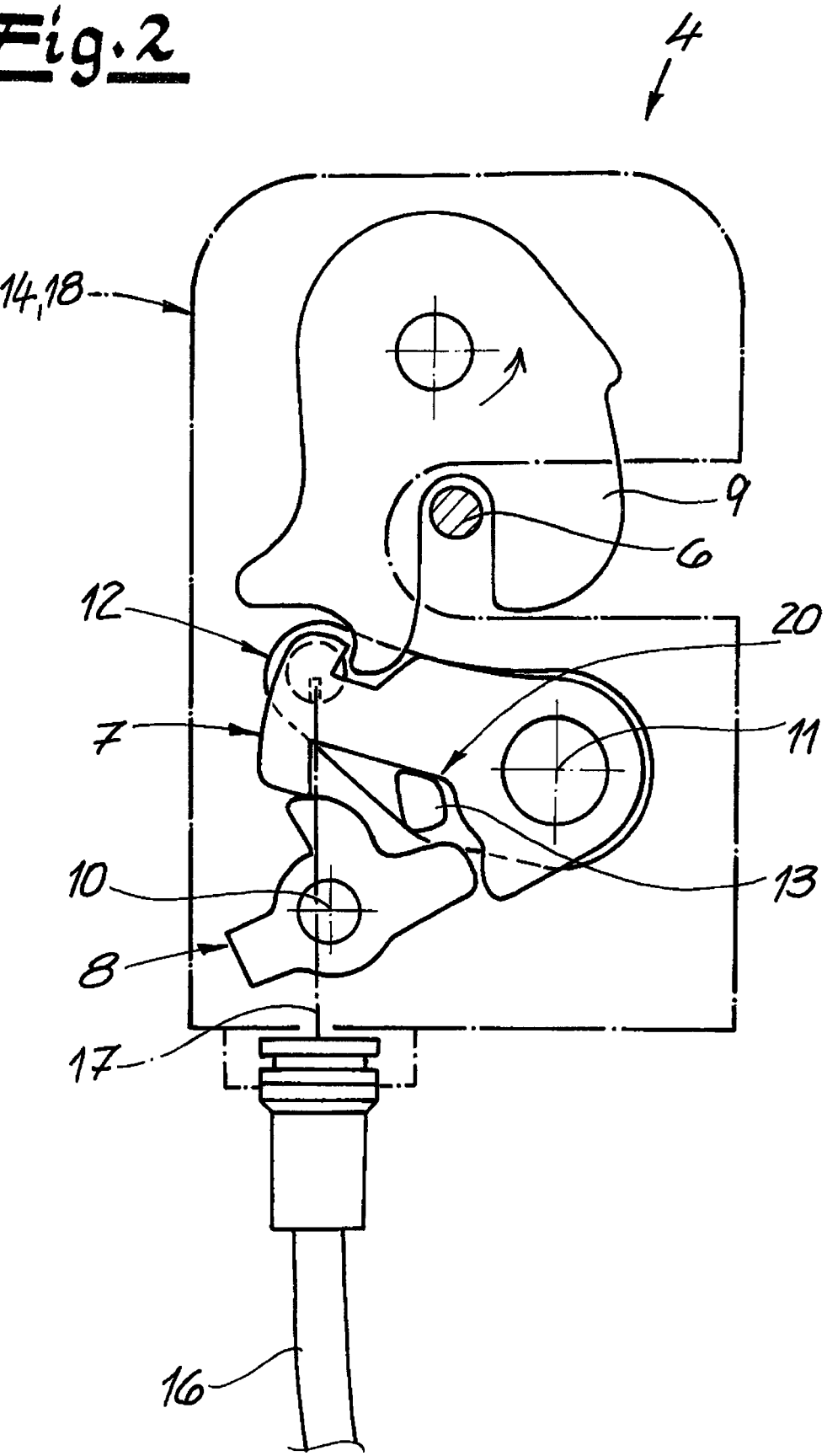
Figure 3A:
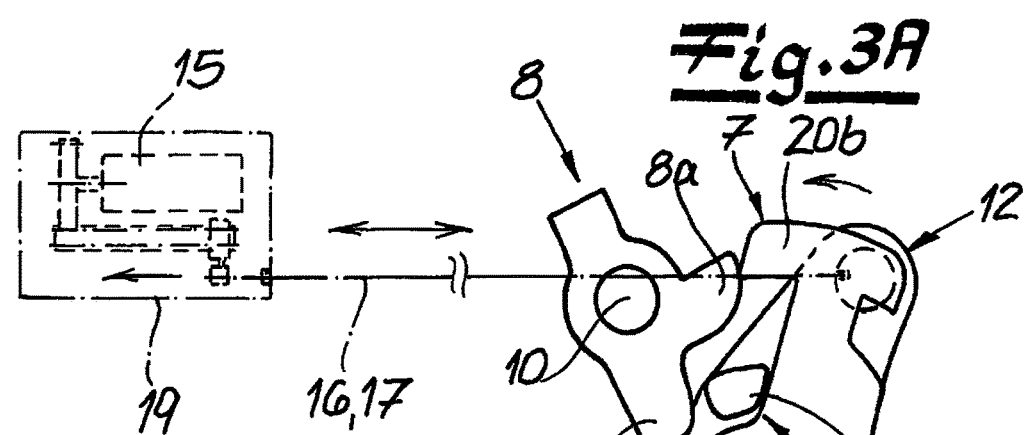
Figure 3B:
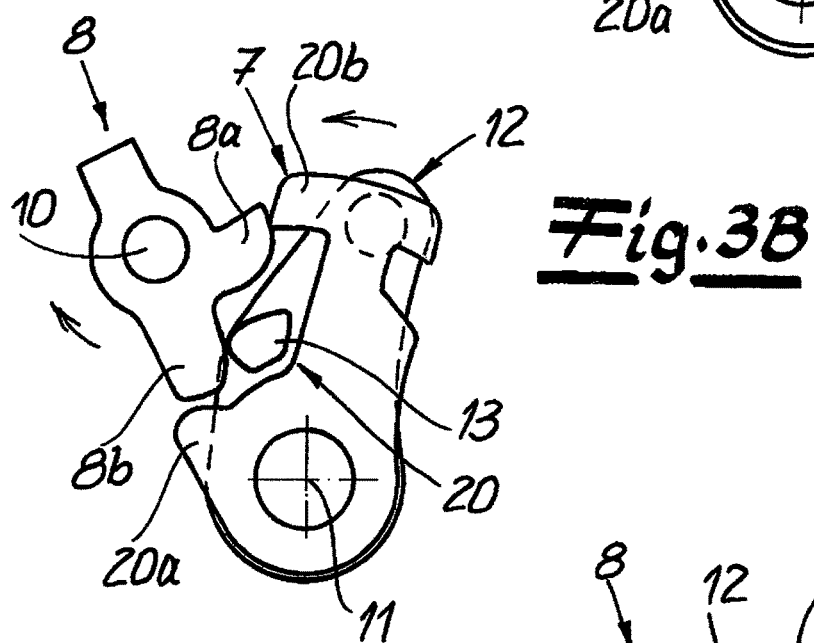
Figure 3C:
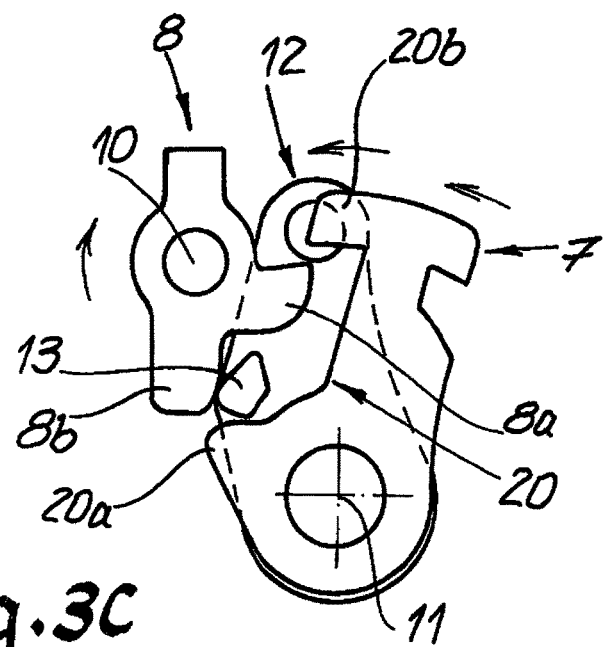

In the following, the invention will be explained in greater detail with reference to a drawing representing just one exemplary embodiment thereof. In the drawing:

FIG. 1 shows a motor vehicle seat fitted with the motor vehicle door lock according to the invention, FIG. 2 is a general view of the motor vehicle door lock according to the invention, and FIG. 3A to 3C shows the locking mechanism of the motor vehicle door lock of FIG. 2 in various functioning positions.

FIG. 1 initially shows a diagrammatic representation of a motor vehicle seat 1. Motor vehicle seat 1 does not necessarily represent a rear seat only, it may be any seat in the vehicle. Motor vehicle seat 1 is equipped with a foldable backrest or back section 2 and a seat surface 3. Back section or backrest 2 is able to be shifted from an upright to a folded position by moving in the direction of the arrow in FIG. 1.

When back section 2 is in the upright position, back section 2 is locked with respect to a vehicle body 5 by means of a backrest lock 4. As soon as backrest lock 4 is unlocked back section 2 can be folded down onto seat surface 3, in the position marked by the dashed line shown in FIG. 1, allowing access to, for example, a luggage compartment located behind back section 2 or a general rear part of the motor vehicle, which is not shown in detail. Back section 2 is equipped with a retaining bolt 6, which cooperates with a locking mechanism 7, 8, 9 of backrest lock 4 as illustrated in FIG. 2.

It should be stressed that the backrest lock 4, which will be described in greater detail in the following, only represents a specialised case of the motor vehicle door lock that is claimed and described in overall terms. This means that in the following notes, in principle retaining bolt 6 may also be a conventional deadbolt, which may be connected to the vehicle body 5 and cooperates in the usual with the associated motor vehicle door lock mounted in or on the motor vehicle door. In other words, the backrest lock 4 will be described more closely and in detail in the following. But a motor vehicle door lock may also be constructed generally according to the invention.

At all events, the inventive motor vehicle door lock and the back section 4 illustrated generally include the locking mechanism 7, 8, 9 described in the preceding, consisting essentially of a rotary latch 9, a ratchet pawl 7 and a blocking element 8. This is shown in FIG. 2. Ratchet pawl 7 is often also referred to as the first ratchet pawl or the comfort pawl. On the other hand, blocking element 8 is referred to in this notation as the second ratchet pawl.

In the exemplary embodiment, blocking element 8 is constructed as a blocking lever 8 which is mounted so as to be pivotable about an axis 10. Ratchet pawl 7 is also mounted so as to be pivotable about an axis 11. The same applies for a triggering element 12 with a protruding triggering pin 13.

In fact, triggering element 12 and ratchet pawl 7 are mounted on the same axis with respect to the shared axis or axis of rotation 11. Axis of rotation 11 is defined by a bearing bolt fixed on a lock case 14. The same applies for the axis or axis of rotation 10 of blocking element or blocking lever 8. In this case too, the bolt is a bearing bolt anchored in lock case 14. Each of the bearing bolts stands substantially vertically on lock case 14, which is aligned largely parallel to the drawing plane in FIG. 2. Triggering element 12 is constructed as a trigging lever 12 that is pivotable about axis of rotation 11.

As shown in the plan view of FIG. 2 and in FIGS. 3A to 3C, triggering element or triggering lever 12 is arranged "behind" ratchet pawl 7, so triggering pin 13 is supported on top of triggering element or triggering lever 12 in order to be able to cooperate with both blocking element 8 and ratchet pawl 7, as will be explained in greater detail in the following. The basic construction further includes a drive unit 15, 16, 17 that acts on triggering element 12.

According to the invention, drive unit 15, 16, 17 is realised as a linear adjustment drive. In fact, drive unit 15, 16, 17 consists of an electric motor 15 and a transmission element 16, 17 connected thereto. Transmission element 16, 17 serves to transmit linear movements, indicated by a double-headed arrow, to triggering element 12. In this way, it is possible to pivot triggering element 12, starting in the function position according to FIG. 3A, counterclockwise about its axis 11 until its functional position according to FIG. 3C is essentially reached. Triggering element 12 may also be restored to its starting position.

Linear drive unit 15, 16, 17 is a miniature linear drive unit 15, 16, 17, that is to say a drive unit for which the dimensions, particularly those of the electric motor 15, are in the order of millimetres. Typically, it also weighs about 100 g. In the embodiment, transmission element 16, 17 has the form of a Bowden cable, with a sleeve 16 and a core 17.

The figures show that drive unit 15, 16, 17 is located separately from a lock housing 14, 18. In fact, in the embodiment, lock housing 14, 18 consists of the lock case 14 indicated in outline in FIG. 2 and a lock cap or lock covering 18, which together accommodate the locking mechanism 7, 8, 9 shown in FIG. 2. In general, drive unit 15, 16, 17 may also be accommodated and arranged inside said lock housing 14, 18. However, that arrangement is not shown.

Instead, the embodiment illustrated works with a drive unit 15, 16, 17 located separately from lock housing 14, 18, which functions with the aid the transmission element 16, 17, the Bowden cable 16, 17 provided here in the embodiment, as described previously, acts on triggering element 12, as will be explained in greater detail in the following.

The drive unit and electric motor 15 is connected to a base 19. Sleeve 16 of Bowden cable 16, 17 is also fixed to said base 19. Base 19 is connected in turn to the motor vehicle body 5. In this way, base 19 not only functions as an abutment for core 17 of Bowden cable 16, 17, which is therefore able to carry out the linear adjustment movements indicated by the double-headed arrow, but can also transmit said movements to triggering element 12.

In the following, the method of operation of the motor vehicle door lock according to the invention in the form of the backrest lock 4 as shown will be explained in detail, starting from the function position in FIG. 3A. In FIG. 3A, the motor vehicle door lock is shown with the locking mechanism 7, 8, 9 thereof in the "locked" state. In this state, the rotary latch 9 shown in FIG. 2 is closed, and retaining bolt 6, which is positioned there and connected to back section 2, is trapped by rotary latch 9. Consequently, back section 2 in the embodiment is locked with respect to vehicle body 5. In such case, in order to unlock back section 2, a drive unit 15, 16, 17 must be subjected to an actuating force. This may be applied via a switch, a remote controller or by some other means.

In the exemplary embodiment, the required unlocking control pulse for drive unit 15, 16, 17 corresponds to the electric motor 15 actuating transmission element 16, 17, that is to say the Bowden cable 16, 17 provided in this context, in such manner that the core 17 of Bowden cable 16, 17 connected to triggering element 12 pivots triggering element 12 from the position shown in FIG. 3A counterclockwise about axis of rotation 11. As a result of this, the triggering pin 13 protruding from triggering element 12 is moved into an operative connection with the blocking element or blocking lever 8.

In fact, the design as shown in FIGS. 3A to 3C is realised in such manner that triggering pin 13 is arranged in a recess 20 in ratchet pawl 7. It may be seen that said recess is in a "U" shape, the open end of which faces toward blocking element 8, at a distance therefrom. This allows blocking element 8 in the locked position according to FIG. 3A to retain ratchet pawl 7 in the locked position shown in the same figure. The same applies for rotary latch 9, which is also in the locked position.

This securing of ratchet pawl 7 and therewith also of rotary latch 9 in the locked position of back section 2 with respect to vehicle body 5 as shown in FIGS. 3A and 2 is designed to take into account the fact that any manufacturing tolerances and/or for example weakening restoring forces of a seat cover on back section 2 or on seat surface 3 cause or may cause the illustrated backrest lock 4 initially sits in a "stiff" condition on delivery, and gradually becomes "looser" with frequent use and over time. In order to ensure that the illustrated backrest lock 4 cannot become unlocked inadvertently as a result of this, blocking element 8 ensures that ratchet pawl 7 is secured in the locked position as shown in FIGS. 2 and 3A. Because blocking element 8 helps to block any pivoting movement by ratchet pawl 7.

The blocking element or blocking lever 8 is provided and positioned at the open end of recess 20 on ratchet pawl 7. In fact, for this purpose, blocking element 8 is furnished with two blocking arms 8a, 8b, which describe an obtuse angle relative to axis of rotation 10. The design is further realised such that the two blocking arms 8a, 8b practically span the recess 20 in ratchet pawl 7. In fact, the ends of the two blocking arms 8a, 8b each rest on one of the legs 20a, 20b of the "U"-shaped recess 20, and are oriented in direct proximity thereto for this purpose. By this means, the desired securing of ratchet pawl 7 is assured, assisted by blocking element 8 when locking mechanism 7, 8, 9 is in the "locked" position.

In this situation, as soon as drive unit 15, 16, 17 has received a corresponding signal, for example from a control unit (not shown), for unlocking back section 2 with respect to vehicle body 5, this signal causes core 17 of the Bowden cable 16, 17 in the illustration according to FIG. 3A to move to the left. This in turn results in the triggering element or triggering lever 12 to pivot counterclockwise about its axis of rotation 11. Consequently, triggering pin 13 standing on triggering element or triggering lever 12 comes into contact with the one blocking arm 8b of blocking element 8.

This causes blocking element or blocking lever 8 to pivot clockwise about its axis of rotation 10 in the transition from FIG. 3A to FIG. 3B, as indicated by an associated arrow. This in turn causes the other blocking arm 8a of blocking element 8 to move out of the corresponding leg 20b of "U"-shaped recess 20. Ratchet pawl 7 is thus released from blocking element 8, as is shown in the further advance of the function according to FIG. 3C.

The drive unit or linear adjustment drive 15, 16, 17 thus cooperates successively, first with blocking element 8, as shown in the transition from FIG. 3A to FIG. 3B. This caused blocking element 8 to pivot clockwise in the exemplary embodiment, so that ratchet pawl 7, which was initially blocked by blocking element 8, is also released. This allows linear adjustment drive 15, 16, 17 to then act on ratchet pawl 7. For this, as triggering element 12 continues its movement, triggering pin 13 moves counterclockwise about its axis of rotation 11, toward leg 20a of "U"-shaped recess 20.

This causes ratchet pawl 7 to follow the counterclockwise pivoting movement of triggering element 12. Since triggering element 12 and ratchet pawl 7 are mounted in lock case 14 on the same axis relative to the shared axis of rotation 11, in the illustration according to FIG. 3C, ratchet pawl 7 is pivoted counterclockwise about said axis of rotation 11 and is then lifted clear of rotary latch 9. Rotary latch 9 may now pivot, under spring force for example, counterclockwise about its axis of rotation according to the indication in FIG. 2, thereby releasing the previously trapped retaining bolt 6. Then, back section 2 is able to be folded down onto seat surface 3 in accordance with the dashed outline in FIG. 1.

The invention claimed is:

1. A motor vehicle lock for a motor vehicle door or a motor vehicle seat, the motor vehicle lock comprising:
    a locking mechanism having a rotary latch, a ratchet pawl that ratchets the rotary latch, and a blocking element for the ratchet pawl;
    a triggering element that engages the blocking element and moves the blocking element into a position that releases the ratchet pawl; and
    a drive unit that directly acts on the triggering element, wherein the drive unit is constructed as a linear adjustment drive including an electric motor which transmits linear movement to the triggering element whereby the triggering element pivots so that it interacts in succession, wherein the triggering element first makes direct contact with the blocking element to move the blocking element into the position that releases the ratchet pawl, and then continues to move whereby the triggering element subsequently makes direct contact with the ratchet pawl to move the ratchet pawl and release the rotary latch,
    wherein the triggering element comprises a triggering pin that first directly contacts the blocking element to move the blocking element into the position that releases the ratchet pawl, and then subsequently, the triggering pin directly contacts the ratchet pawl.

2. The motor vehicle lock according to claim 1, wherein the drive unit is connected to a lock housing.

3. The motor vehicle lock according to claim 2, wherein the drive unit is connected to a base, which also supports the sleeve of the Bowden cable.

4. The motor vehicle lock according to claim 1, wherein the drive unit is located separately from a lock housing and acts on the triggering element via a transmitting element.

5. The motor vehicle lock according to claim 4, wherein the transmitting element is constructed as a Bowden cable having a sleeve and a core.

6. The motor vehicle lock according to claim 1, wherein the ratchet pawl and the triggering element are mounted on the same axis on a lock case.

7. The motor vehicle lock according to claim 1, wherein the triggering pin is arranged in a recess on the ratchet pawl.

8. The motor vehicle lock according to claim 7, wherein the recess has a "U"-shape.

9. The motor vehicle lock according to claim 7, wherein the blocking element is provided on the open end of the recess.

10. The motor vehicle lock according to claim 1, wherein when the triggering pin subsequently directly contacts the ratchet pawl, the triggering pin maintains direct contact with the blocking element whereby the triggering pin has direct contact with each of the blocking element and the ratchet pawl.

11. The motor vehicle lock according to claim 1, wherein prior to activation of the triggering lever by the drive unit, the triggering lever is in non-contact with the blocking element.

* * * * *